United States Patent [19]

Newton

[11] 4,064,003
[45] Dec. 20, 1977

[54] RUPTURE DISC

[75] Inventor: Robert G. Newton, Pittsburgh, Pa.

[73] Assignee: The United States of America as represented by the United States Energy Research and Development Administration, Washington, D.C.

[21] Appl. No.: 671,912

[22] Filed: Mar. 29, 1976

[51] Int. Cl.² .............................................. G21C 9/00
[52] U.S. Cl. .................................. 176/38; 137/68 R; 176/40; 176/65
[58] Field of Search .................... 137/68 R, 797, 319; 222/83, 81; 176/37, 38, 40, 87

[56] References Cited

U.S. PATENT DOCUMENTS

| 2,449,060 | 9/1948 | Daigle | 222/566 |
|---|---|---|---|
| 2,849,156 | 8/1958 | Mansted | 222/83 |
| 3,525,350 | 8/1970 | Hosek | 137/68 |
| 3,583,479 | 6/1971 | Taylor et al. | 165/134 |
| 3,845,879 | 11/1974 | Dernbach et al. | 220/89 A |
| 3,878,766 | 4/1975 | Jerabek et al. | 91/469 |

*Primary Examiner*—Verlin R. Pendegrass
*Assistant Examiner*—Ralph Palo
*Attorney, Agent, or Firm*—Dean E. Carlson; Frank H. Jackson

[57] ABSTRACT

The intermediate heat transport system for a sodium-cooled fast breeder reactor includes a device for rapidly draining the sodium therefrom should a sodium-water reaction occur within the system. This device includes a rupturable member in a drain line in the system and means for cutting a large opening therein and for positively removing the sheared-out portion from the opening cut in the rupturable member. According to the preferred embodiment of the invention the rupturable member includes a solid head seated in the end of the drain line having a rim extending peripherally therearound, the rim being clamped against the end of the drain line by a clamp ring having an interior shearing edge, the bottom of the rupturable member being convex and extending into the drain line. Means are provided to draw the rupturable member away from the drain line against the shearing edge to clear the drain line for outflow of sodium therethrough.

4 Claims, 6 Drawing Figures

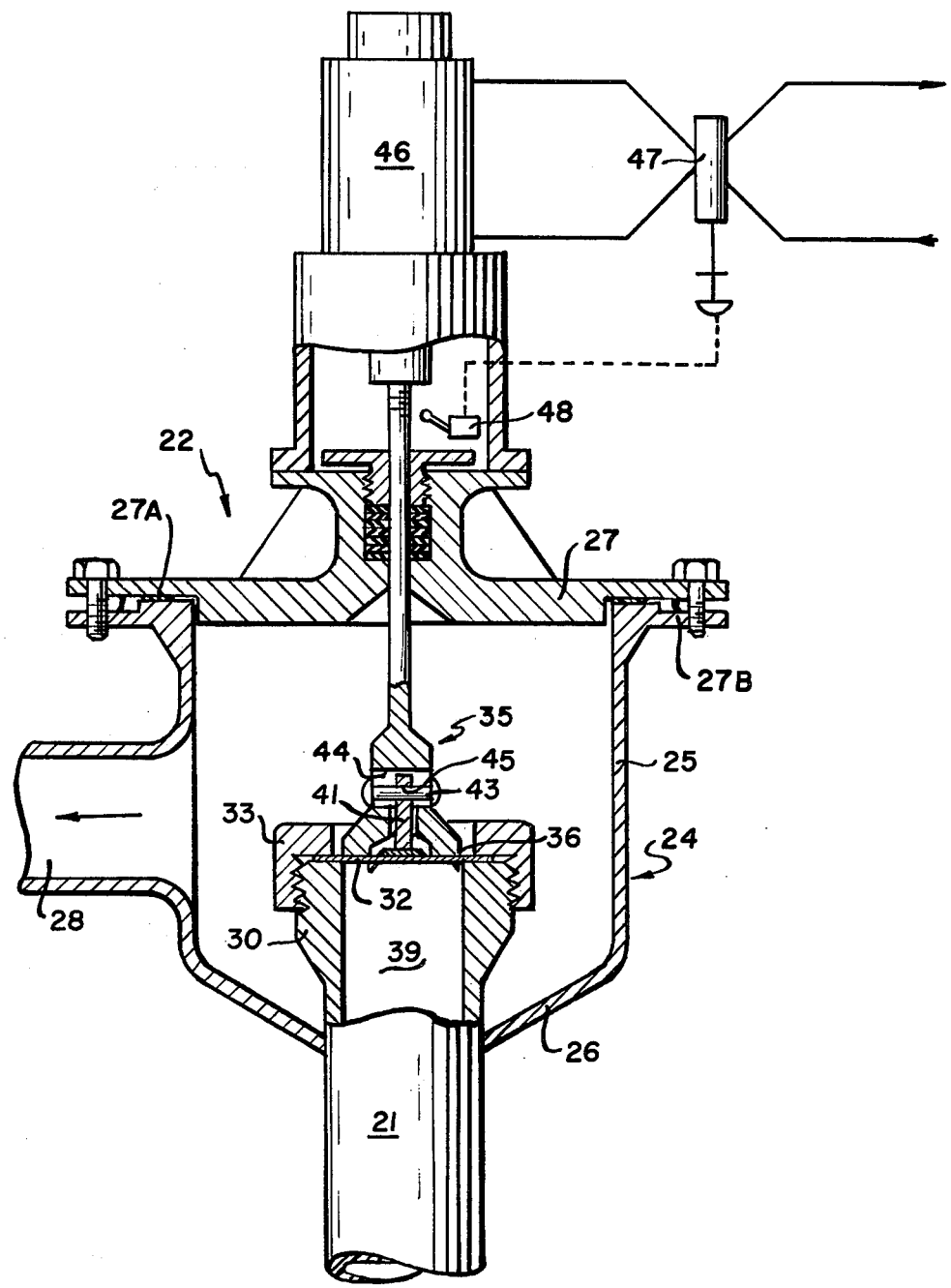

RUPTURE DISC

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a device for shearing an opening in a rupture disk. In more detail the invention relates to a device for shearing an opening in a rupturable member which includes means for positively removing the sheared-out portion of the member from the opening. In still more detail the invention relates to an intermediate heat transport system (IHTS) for a liquid-metal-cooled nuclear reactor (LMFBR) incorporating a rupturable member, and means for cutting a large opening in the rupturable member and for positively removing the sheared-out portion of the rupturable member from the opening.

The heat developed in a LMFBR is removed therefrom by a Primary Heat Transport System (PHTS) and the heat thereof is transferred to an Intermediate Heat Transport System (IHTS) in an Intermediate Heat Exchanger (IHX). Sodium is normally used as coolant in both systems and the secondary sodium in the IHTS is employed to boil water and superheat the resulting steam.

It has been proposed that the IHTS of a LMFBR be provided with means for draining the sodium therefrom rapidly on command from a plant operator or from a sensor detecting a sodium-water accident within the system to limit the transport of corrosive liquid and solid sodium-water reaction products and so avoid damage to expensive, vulnerable pumps. It is necessary that the valves through which the sodium is drained must form a hermetic seal for the sodium which remains intact during normal and upset plant conditions while retaining the capability of being opened on command.

Present plans to accomplish this dumping are to drain simultaneously through multiple, relatively large lines connected in parallel from the IHTS loop to a dump tank. Plans are to include two normally closed valves in series in each drain line so that the total sodium inventory of the system can be maintained as consistent as possible over long periods. Such an arrangement would not be completely satisfactory in view of the long plant life (30 years) planned for LMFBR's. Over 30 years even the slight amount of leakage with the best current valve practice (2 cc/hr./in. seat diameter) may accumulate to a significant amount and also the high contact loadings between seat and disk of the tightly closed valves in high temperature sodium may result in self-welding of these mating parts jeopardizing the reliability of the system.

It has also been suggested that the foregoing problems might be satisfactorily answered by use of a mechanically actuated rupture disk which would be welded into position to positively seal the drain line. However, a conventional rupture disk such as those employed for pressure relief would not be satisfactory since a tear or small opening in the disk would dissipate the pressure but solid products from a sodium-water reaction might not pass through a tear or small opening. In addition, if parts of the rupture disk are free to move downstream, they may lodge somewhere in the drain line and cause solid reaction products to accumulate therein. Thus, it is essential that 1. the rupture disk must have an opening in it at least equal to that possible with a valve and
2. there must be no loose parts generated by the rupturing.

SUMMARY OF THE INVENTION

According to the present invention the intermediate heat transport system for a liquid-metal-cooled nuclear reactor includes a device for rapidly draining the sodium therefrom should a sodium-water reaction occur within the system. This device comprises a rupturable member extending across a drain line to confine the sodium within the system and means for cutting a large opening in the diaphragm and for positively removing the cut-out portion of the diaphragm from the opening cut in the diaphragm. According to the preferred embodiment of the invention the rupturable member includes a solid head seated in the end of the drain line having a rim extending peripherally therearound, the rim being clamped against the end of the drain line by a clamp ring having an interior shearing edge. The bottom of the solid portion is convex and extends into the drain lines. Means are provided to draw the rupturable member away from the drain line against the shearing edge. Another embodiment of the invention is also disclosed.

BRIEF DESCRIPTION OF THE DRAWINGS

FIG. 2 is a vertical section of a device for rapidly draining the intermediate heat transport system shown in FIG. 1;

DESCRIPTION OF THE PREFERRED EMBODIMENT

Figure 1:
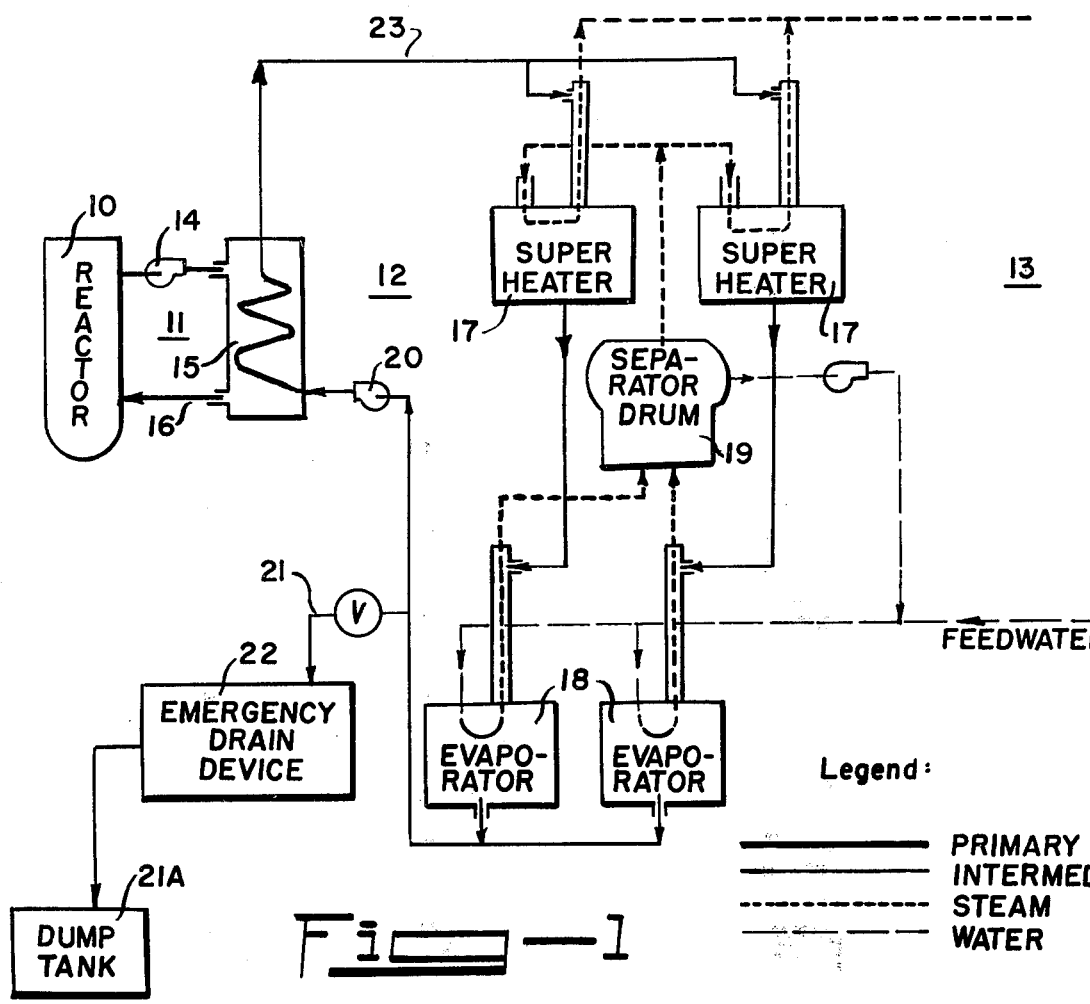
FIG. 1 is a block diagram of a liquid-metal-cooled nuclear reactor heat transport system incorporating the present invention.

As shown in FIG. 1 the heat transport system for a liquid-metal-cooled nuclear reactor 10 includes a primary heat transport system (PHTS) 11 employing sodium as coolant, an intermediate heat transport system (IHTS) 12 also employing sodium as coolant, and a steam system 13. PHTS 11 includes nuclear reactor 10, pump 14, intermediate heat exchanger (IHX) 15, and piping 16 connecting these components of the system. IHTS 12 includes IHX 15, superheaters 17, evaporators 18, pump 20, a drain line 21 leading to a dump tank 21A, said drain line containing a device 22 for dumping the sodium from the IHTS and piping 23 connecting the components of the system. Steam system 13 includes a steam separator drum 19. The superheated steam developed in steam system 13 is employed to do useful work as in a steam turbine. In accordance with usual practice a plurality of loops as shown will be employed to cool reactor 10 and a plurality of emergency drain devices 22 connected to different parts of the IHTS will be incorporated in IHTS 12.

Primary pump 14 takes exit sodium from the reactor 10 and pumps it into the shell side of IHX 15 from which it is returned to the reactor. Intermediate sodium flows through the tube side of IHX 15 and flows therefrom to the top of superheaters 17, flows down through the superheaters and exits to evaporators 18. Intermediate sodium pump 20 returns the intermediate sodium to IHX 15. Feed water and recirculated water from separator drum 19 enters the tube side of evaporator 18 and a mixture of steam and water go to separator drum 19. Steam is taken from the steam separator drum 19 to the superheaters 17 from which it is employed to do useful work. In accordance with the present invention device 22 in drain line 21 is provided to drain sodium rapidly from the IHTS to dump tank 21A upon command from a plant operator or from a sensor detecting a sodium-water accident within the system.

Referring now to FIG. 2 a modified angle pattern with a "free-standing" seat has been selected for the design of emergency drain device 22. The advantages thereof will be made apparent hereinafter. Device 22 includes a body 24 consisting of a vertically disposed, cylindrical side wall 25, a conical bottom 26 and a cover and bonnet assembly 27. A gasket 27A and canopy 27B (optional) are employed to seal cover 27 to body 24. An outlet line 28 penetrates wall 25 horizontally and drain line 21 penetrates conical bottom 26 body 24. The wall of drain line 21 has an enlarged portion 30 at the end thereof which forms the seat for a rupturable member consisting of a diaphragm 32 which is welded to the end of drain line 21 and in addition held there against by clamp ring 33 which is threaded onto enlarged portion 30. Three centering tabs 34 (see FIG. 3) are provided on the lower surface of rupturable member 32 for use in assembly. Clamp ring 33 is provided to restrict the motion of the perimeter of the diaphragm so that the root of the fillet weld will not be retained in tension.

Figure 3:
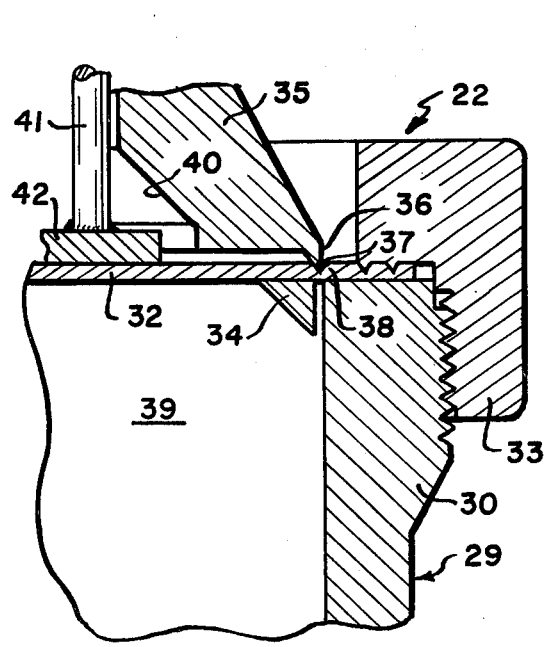
FIG. 3 is a detail thereof showing the device in standby position.
Figure 4:
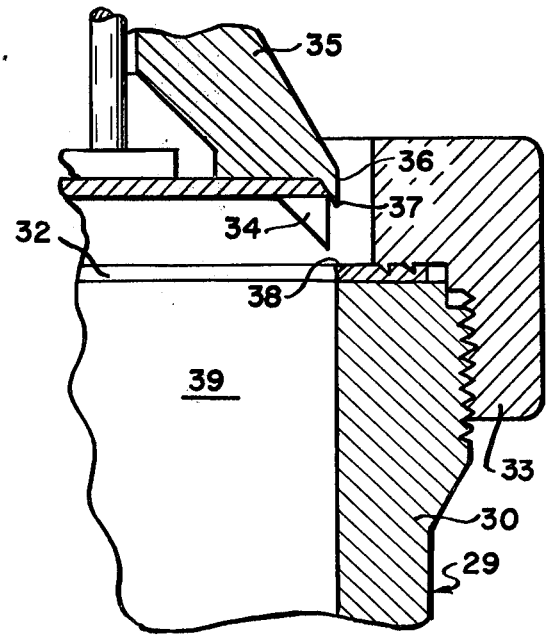
FIG. 4 is a similar detail showing the device after it has been operated.

Referring next to FIGS. 3 and 4, as well as FIG. 2, a punch 35 having a circular shearing edge 36 having three sharp projections 37 thereon at 120° intervals is centered on rupturable member 32 with projections 37 resting in a groove 38 in diaphragm 32 of the same diameter as the cutting edge 36 of punch 35 provided to ensure that the shearing action of the punch will occur at the desired diametrical location on the rupturable member. The diameter of the shearing edge 36 is just slightly less than the diameter of the throat 39 of drain line 21. Punch 35 has a bottom-located axial recess 40 therein in which is located a stem connector 41 having a base 42 thereon welded to rupturable member 32. Stem connector 41 is attached to the punch 35 by a lost motion connection comprising a pin 43 extending through slot 44 in the side wall of punch 35 and a hole 45 in stem connector 41. Slot 44 is so arranged that stem connector 41 can lag behind when punch 35 is advanced to cut an opening in rupturable member 32 and yet on retraction the punch will carry the sheared-out portion of the rupturable member with it to completely clear the opening in the rupturable member of obstructions. FIGS. 3 and 4 make operation of the rupturable member according to the present invention clear. Punch 35 is hydraulically actuated with air from cylinder 46 by means of 4-way valve 47, a limit switch 48 causing the punch to reverse direction after the required opening in the rupturable member is cut.

As has been stated the body of the rupturable member according to the present invention has been shown as a modified angle pattern with a free standing seat. This construction has been chosen since it appears to offer the least possible resistance to flow. It will be noted that the connection to the sodium loop is under the rupturable member and that the volume in the drain line extending from the circulating loop to the underside of the rupturable member diaphragm has been left free of any parts to permit free circulation of sodium thereby minimizing deposition of corrosion products. As a corollary the threaded joints and close clearances of parts above the rupturable member are in an inert gas atmosphere (from the dump tank) and so have maximum protection from corrosion thus ensuring proper functioning when and if required.

The present rupture device is so constructed that the body 24 thereof is welded in place in the drain line for the intermediate heat transport loop and remains in place permanently. The remainder of the device is assembled onto it by welding the rupturable member with preassembled stem connector 41 thereto, attaching clamp ring 33, and placing cover and bonnet assembly 27 in position thereon. Stem packing is then inserted and the actuating mechanism attached. This construction is a distinct advantage for maintenance and inspection operations.

Figure 5:
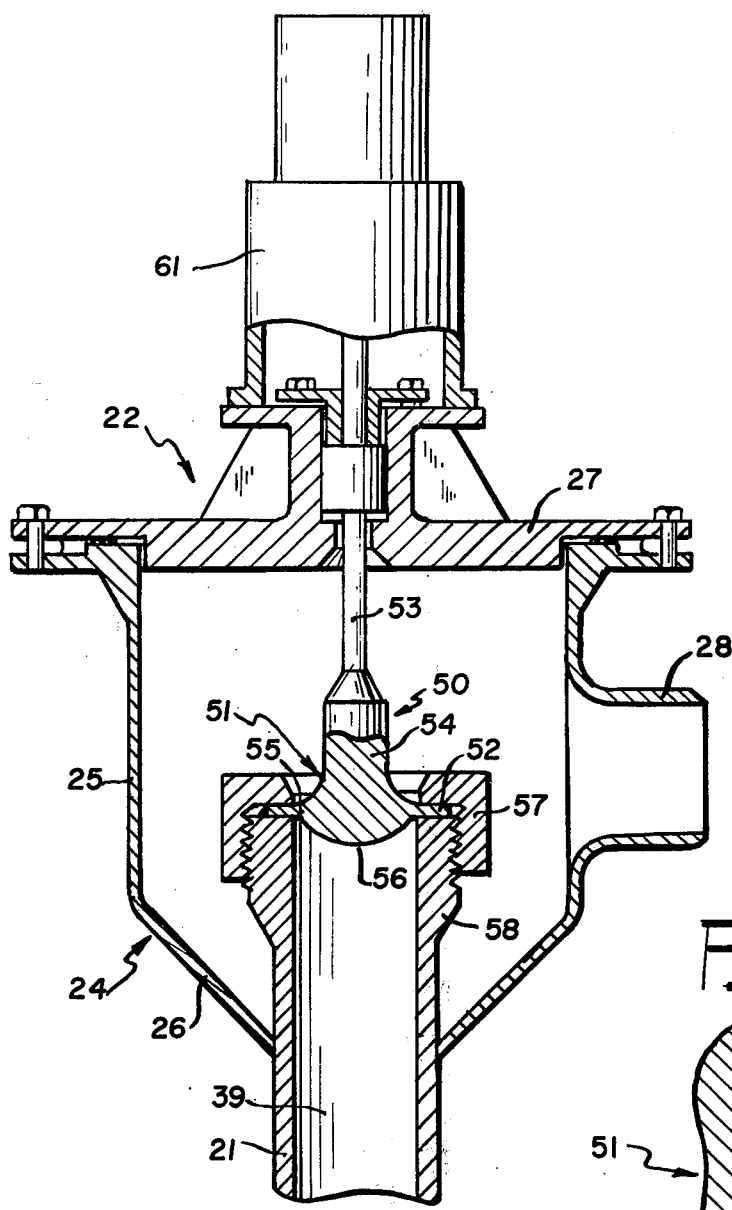
FIG. 5 is a vertical section of a preferred form of the device.
Figure 6:
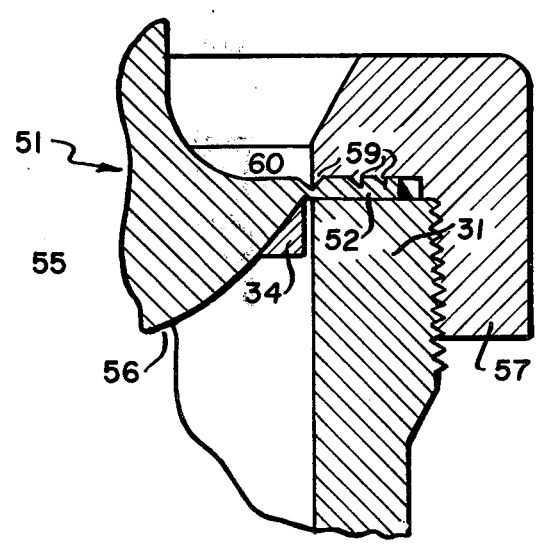
FIG. 6 is a detail thereof.

Referring next to FIGS. 5 and 6 the preferred embodiment of the present invention will now be described. Many elements in this embodiment of the invention are identical to elements present in FIGS. 2 to 4 and these elements will not be further described.

According to this embodiment of the invention rupturable member 50 includes a solid head 51 seated on the upstanding end of drain line 21 having a rim 52 extending circumferentially therearound and an actuating stem 53 attached thereto. Solid closure head 51 includes an elongated, cylindrical transition portion 54 which flares into a wider portion 55 approximately the same diameter as the drain line 21. The bottom surface 56 of the rupturable member is convex and extends into drain line 21. Rim 52 is welded to the end of drain line 21 and in addition is held thereagainst by clamp ring 57 which is threaded onto enlarged portion 58 of clamp ring 57. The inner circumference of the clamp ring 57 constitutes a shearing edge and projections 59 thereon and groove 60 in rim 52 serve the same purpose as do projections 37 and groove 38 shown in FIGS. 3 and 4.

To operate the rupture device a single-direction power operator 61 draws the rupturable member 50 upwardly against shearing edge 56 on clamping ring 55 leaving a clear opening in throat 39 for the passage of sodium therethrough.

This embodiment is considered the superior arrangement for a variety of reasons:

a. Only a single stroke actuator is used. The two-stroke action of the other assembly requires double the time to complete the shearing of the diaphragm.

b. Two-stroke action is not considered as reliable as single-stroke action since it depends on proper operation of a separate sensing limit switch and reversing air valve.

c. The additional internal parts, switch, and valve, and their maintenance makes the two-stroke apparatus of the present application draft more expensive than the single-stroke version.

d. The single stroke assembly places the stem in tension during the high-load shearing of the diaphragm. This avoids the possibility of stem buckling.

e. The internal, lost-motion linkage of the two-stroke apparatus may be made adequate for the service but is inherently weaker and more subject to failure than the stem of the single-stroke assembly; which does not include stress concentration of slot and pin, and the impact loading resulting from the use of the linkage.

It should be noted that the specific construction employed provides maximum resistance to strain from normal pressure fluctuations within the sodium system while ensuring rapid, positive valve opening when required. The convex construction of the bottom of the rupturable member ensures that no bulges in the rupturable member can occur and directs the pressure from below inwardly toward the relatively rigid, highly stressed stem actuator.

The embodiments of the invention in which an exclusive property or privilege is claimed are defined as follows 1. In the intermediate heat transport system of a sodium-cooled nuclear reactor incorporating an intermediate sodium-to-sodium heat exchanger, sodium-to-water heat exchangers, a pump and a drain line, the improvement comprising a device for rapidly draining the heat transport system including a body having a cylindrical side wall, a conical bottom and a cover, an outlet line leading to a dump tank penetrating the side wall, said drain line penetrating said body vertically through the apex of the conical bottom and terminating in an enlarged portion within the interior of the body, a diaphragm welded to the end of the drain line and held thereagainst by a clamp ring threaded onto the enlarged portion of the drain line and having a circular groove therein of slightly less diameter than the drain line, a punch having a circular shearing edge thereon of the same diameter as said groove and having sharp projections thereon resting in said groove, said punch having an axial recess in the bottom thereof, a stem connector disposed in said recess fixedly connected to said diaphragm and attached to the punch by a lost motion connection and means for actuating said punch to cut a circular opening in the diaphragm and for withdrawing the punch thereby removing the sheared-out portion of the diaphragm from the opening cut in the diaphragm.

2. In the intermediate heat transport system for a sodium-cooled nuclear reactor including an intermediate sodium-to-sodium heat exchanger, sodium-to-water heat exchangers, a pump and a drain line, the improvement comprising a device for rapidly draining sodium from the heat transport system including a body having a cylindrical side wall, a conical bottom and a cover, an outlet line leading to a dump tank penetrating the side wall, said drain line penetrating the body vertically through the apex of the conical body and terminating in an enlarged portion within the interior of the body, a rupturable member seated on the end of the drain line consisting of a solid head including a portion approximately the same diameter as the drain line, an elongated transition portion of lesser diameter, an actuating stem, and a rim extending circumferentially around the solid head, said rim being welded to the end of the drain line and held thereagainst by a clamp ring, the inner circumference of which constitutes a shearing edge, said rim having a circular groove therein of slightly less diameter than the drain line, the shearing edge of the clamp ring having three sharp projections thereon 120° apart adapted to rest in the groove, the bottom of the rupturable member being convex and extending into the drain line, and means for pulling the rupturable member upwardly against the shearing edge of the clamp ring to clear the throat of the drain line for outflow of sodium therethrough.

3. A device for rapidly draining sodium from a piping system having a drain line therein comprising a body including a cylindrical side wall, a conical bottom and a cover, an outlet line leading to a dump tank penetrating the side wall, said drain line penetrating said body vertically through the apex of the conical bottom and terminating within the interior of the body, a rupturable member comprising a diaphragm extending across the end of the drain line and welded thereto, and means for shearing an opening in said rupturable member approximately the size of the throat of the drain line and for positively removing the sheared-out portion of the rupturable member from the opening cut therein comprising a punch having a circular shearing edge thereon approximately the size of the drain line, a stem fixedly attached to the diaphragm and attached to the punch by a lost motion connection and means for actuating the punch to cut a circular opening in the diaphragm and for retracting the punch whereby the sheared-out portion of the diaphragm is removed from the opening in the metal diaphragm.

4. A device for rapidly draining sodium from a piping system having a drain line therein comprising a body including a cylindrical side wall, a conical bottom and a cover, an outlet line leading to a dump tank penetrating the side wall, said drain line penetrating said body vertically through the apex of the conical bottom and terminating within the interior of the body, a rupturable member extending across the end of the drain line, said rupturable member including a solid head having a portion approximately the same diameter as the throat of the drain line having a rim extending peripherally therearound seated on the open end of the drain line, the rim being welded to the end of the drain line and clamped thereagainst by a clamp ring having an interior shearing edge, the bottom of the solid closure head being convex and extending into the drain line and means for pulling the rupturable member upwardly against the shearing edge of the clamp ring to clear the throat of the drain line for outflow of sodium therethrough.

* * * * *